UNITED STATES PATENT OFFICE 2,462,703

COPOLYMERS OF MULTIOLEFINS WITH VINYL ETHERS AND METHOD OF MAKING SAME

David W. Young, Roselle, and William J. Sparks, Westfield, N. J., assignors to Standard Oil Development Company, a corporation of Delaware No Drawing. Application December 29, 1945, Serial No. 638,516

10 Claims. (Cl. 260—86.5)

This invention relates to low temperature copolymers; relates particularly to copolymers having rubbery or resinous properties; and relates especially to copolymers of diolefins or multiolefins with vinyl ethers.

In the past, a very valuable series of copolymers of isoolefins and diolefins or multiolefins which are excellent substitutes for caoutchouc, have been prepared by a low temperature polymerization of mixtures of diolefins and isoolefins, usually isobutylene. However, it has been found that most of the oxygenated compounds including the alcohols, ethers, aldehydes, ketones and organic acids are fatal poisons for the catalyst in this polymerization reaction and the presence of even relatively small amounts of these oxygenated compounds may completely prevent the polymerization reaction.

It is now found however that the so-called "vinyl ethers" in which the oxygen is linked to the same carbon which forms a terminus for the double linkage do not exert the powerful poisoning effect upon the catalyst which is characteristic of oxygenated organic compounds generally, and the poisoning effect, if any, is so slight that it becomes possible to copolymerize these materials with diolefins or multiolefins to yield copolymers having a substantial amount of residual unsaturation, curability, and very high molecular weights ranging to or above Staudinger molecular weight numbers as high as 100,000.

The mixture of vinyl ether and multiolefin may be polymerized over a wide range of proportions; excellent products being obtained with as little as 1% of the multiolefin to as much as 60 or 70% of the multiolefin, with the balance being the vinyl ether; to yield materials which are excellent curable substitutes for rubber or are resinous bodies with excellent thermosetting properties. Other objects and details of the invention will be apparent from the following description:

The primary raw material for the present invention is a vinyl ether. The preferred vinyl ether is the vinyl isobutyl ether having the structural formula

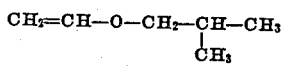

This vinyl ether was prepared by reacting together the sodium salt of isobutyl alcohol with vinyl chloride. The two substances were mixed and heated gently until the sodium chloride ceased to precipitate. The crude vinyl ether was then decanted from the solid sodium chloride and boiled over metallic sodium with a reflux condenser for a substantial period of time (approximately 1 hour); and it was then purified by distillation, the material boiling between 93° C. and 100° C. being collected as the vinyl isobutyl ether. This material was approximately 99% pure.

Other desirable vinyl ethers are found in such substances as dimethallyl ether, divinyl ether having a boiling point of approximately 35.5° C., vinyl propyl ether, vinyl phenyl ether having a boiling point of approximately 155° C., vinyl methyl ether having a boiling point of 12°–14° C., vinyl amyl ether, N-vinyl-alpha methyl indoline ether, and the like.

It may be noted that any raw material having an ethylene radical with an ether oxygen linked thereto may be used. It appears that any substituent desired which is non-oxygenated may be added to the vinyl group and any aliphatic, aromatic or olefinic radical may be attached to the second linkage of the oxygen. These substituents may contain carbon atom numbers up to about 20 and may contain halogen substituents or other substituents except nitrogen or oxygen.

Of particular interest in the present reaction is the polymerization of vinyl ethers containing sulfur substituents such, for instance, as

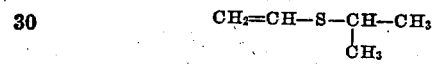

which is vinyl isopropyl thio ether. This thio ether is representative of a considerable family of vinyl thio ethers all of which are equally useful in the present polymerization procedure.

The second raw material may be any diolefin or multiolefin either conjugated or non-conjugated having from 4 to about 15 carbon atoms per molecule. Preferred substances are such compounds as butadiene, isoprene, piperylene, 2-methyl pentadiene, dimethyl butadiene, dimethallyl, myrcene, allocymene, and the like.

These materials may be mixed in practically any desired proportion, depending to some extent on the particular substances chosen. The preferred range is from about 1% of the multiolefin with 99% of the vinyl ether, to about 60 or 70% of the multiolefin with 40 to 30% of the vinyl ether, although by proper choice of multiolefin, still higher proportions of multiolefin may be used.

This mixture of materials is then cooled to temperatures within the range between about +10° C. to −103° C., although in some instances, temperatures as low as the boiling point of liquid methane at −164° may be used. The cooling may be obtained by the use of a refrigerating jacket upon the mixing container and the polymerizer or by the use of an internal refrigerant. For a refrigerating jacket, any low-boiling liquid having a suitable boiling point, either under pressure or vacuum may be used, such substances as liquid propane, liquid sulfur dioxide, liquid carbon dioxide, liquid ethane or liquid ethylene being particularly advantageous. Other desirable substances are the alkyl mono and poly halides including the chlorides, the fluorides and the fluoro chlorides.

When a refrigerating jacket is used, it is frequently desirable to mix with the olefinic material a suitable inert diluent; any of the relatively low boiling hydrocarbons such as butane, pentane, hexane, and the various light naphthas being particularly suitable. Various of the alkyl mono and poly halides are also desirable diluents.

If an internal refrigerant is to be used, it must be inert with respect both to the catalyst and to the olefinic material to be copolymerized. Such substances as liquid propane, liquid or solid carbon dioxide, liquid ethane, liquid ethylene, and, on occasion, even liquid methane, are particularly satisfactory internal refrigerants. These substances may serve simply as refrigerants and there may be present, in addition, more or less of the diluents above mentioned, or the refrigerants may serve also as diluents, depending upon the desired polymerization temperature and characteristics.

The polymerization is desirably conducted at the suitable low temperature by the application to the mixture of a Friedel-Crafts catalyst, preferably in solution in a low-freezing, non-complex-forming solvent. The preferred catalyst is aluminum chloride, but any of the catalysts disclosed by N. O. Calloway in his article on "The Friedel-Crafts synthesis" printed in the issue of "Chemical Reviews" published for the American Chemical Society at Baltimore in 1935, in volume XVII, No. 3, the article beginning on page 327, the list being particularly well shown on page 375, may be used; boron trifluoride and titanium tetrachloride also being particularly effective.

These catalysts are preferably used in solution in a low-freezing, non-complex-forming solvent, as above pointed out; the phrase "low-freezing" meaning that the freezing point is below that of water; and the phrase "non-complex-forming" meaning that the solvent may be evaporated away from the solute with only a minor rise in temperature, to leave behind a residue of the Friedel-Crafts compound substantially free from solvent. Particularly desirable catalyst solvents are the mono or poly halogen substituted alkyl compounds having from 1 to 15 or 16 carbon atoms per molecule, including especially such substances as ethyl or methyl chloride, chloroform, ethylene dichloride, and the various low-freezing fluorides and fluoro chlorides. An especially valuable catalyst solvent is carbon disulfide. Depending upon the catalyst substance chosen, the lighter hydrocarbons are also excellent catalyst solvents. With boron trifluoride, excellent solvents are liquid ethane, liquid propane, liquid butane, and the other lighter hydrocarbons. With aluminum chloro bromide, the same list of solvents is also particularly advantageous, and with both of these compounds, the mono and poly alkyl halides and carbon disulfide are also very useful.

The olefinic mixture is prepared and cooled to the desired low temperature and the catalyst is then added to the mixture. A convenient way to add the catalyst is in the form of a fine spray applied to the surface of the rapidly stirred cold olefinic material, or in the form of a small, high pressure jet into the body of rapidly stirred olefinic liquid. In either procedure it is desirable that the catalyst be stirred into the cold olefins in the shortest possible time, since the reaction is an extremely rapid one and it is desirable to have the catalyst well dispersed during the reaction. The rate of catalyst addition is desirably as rapid as can be adequately stirred into the olefinic mixture. With a batch as large as 100 gallons, the catalyst addition should require less than 10 minutes; with the times for larger and smaller batches in proportion.

It should be noted that the catalyst concentration in the solution varies according to the catalyst chosen. With aluminum chloride, convenient catalyst concentrations lie within the range between 0.5% and about 4%. With the less potent catalysts, higher concentrations may be used; and the total amount of catalyst per se varies between 0.75% and 2.5% of the total amount of polymerized olefins. The catalyst is used up during the polymerization reaction, just how is still unknown, and accordingly, the percent yield can be substantially controlled by limitation of the amount of catalyst solution added. Ordinarily, 2½% of catalyst is sufficient for complete polymerization, and ordinarily approximately 1% of catalyst will carry the polymerization to a 60 to 75% yield.

The resulting catalyst is conveniently separated from the diluent, refrigerant and catalyst solvent in any desired way. A preferred procedure is to discharge the polymerization mixture into warm water, which volatilizes out the residual unpolymerized material and the other volatiles and leaves a slurry of polymer particles in water. This treatment also washes out a substantial portion of the spent catalyst. The polymer is then strained out from the water in any convenient way and dried; it may then be processed in any appropriate manner.

The resulting polymer may have a Staudinger molecular weight number ranging from about 5000 up to 100,000 or 150,000 or even higher; the top limit at present indicated being about 250,000 (these Staudinger numbers representing actual molecular weights of from 10,000 to about 5,000,000, as determined by P. J. Flory in J. Am. Chem. Soc., 65, 372 (1943). The polymers also may have a wide range of unsaturation, depending upon the amount of diolefin copolymerized. If the material is to be used as a substitute for caoutchouc, the preferred iodine number lies between about 1 and 10, and is nearly always below 50. If the polymer is to be used as a thermosetting resin, the iodine number preferably lies above about 50, up to about 250 or 300, depending upon the amount of vinyl ether copolymerized.

In compounds having Staudinger molecular weight numbers above about 30,000, and iodine numbers of 1 or more, the material can be cured into a high-grade substitute for vulcanized rubber. For curing agent, such substances as sulfur, especially in the presence of a sulfurization aid such as Tuads (tetra-methylthiuram disulfide) or the like, or by the use of the quinone dioxime substances such as para quinone dioxime, or dinitroso substances such as dinitroso benzene, or the like. The polymer before curing is a plastic substance which can readily be molded. After curing, it shows a good tensile strength ranging from 250 to 1500 and as high as 3500 pounds per square inch and an elongation at break ranging from 500% to 1200%. A wide range of fillers may be added to the polymer including carbon black, especially the reinforcing blacks, stearic acid, zinc oxide, clay, whiting, vermilion, chrome pigments, and the like.

The higher iodine number, thermosetting polymers likewise may have added thereto a wide range of fillers and pigments including any of the paint pigments, ground cork, wood flour, cotton linters, any of the fabrics, and the like. In fact, any of the ordinary fillers and pigments used with any of the common plastics are useable with this material. It is also an excellent varnish base resin and is soluble in such substances as linseed oil, tung oil, dehydrated castor oil, sardine oil, and the like, including the drying, semi-drying and baking oils generally. In solution in these oils, the polymer is readily cooked to a good oil base which may be used as a clear varnish or may have added thereto any of the usual paint pigments to yield a high-grade enamel or paint.

The polymers are also useful as addition agents for lubricating oils in which they show an excellent increase in viscosity index. In addition, they are reactive with phosphorous pentasulfide, and when so treated and dissolved in lubricants, they show both an excellent increase in viscosity index, and an excellent improvement in extreme pressure properties.

Example 1

Two mixtures were prepared containing respectively 2% and 4% of isoprene, the balance being vinyl isobutyl ether, together with two volumes of methyl chloride. These mixtures were cooled by a refrigerating jacket containing ethylene to a temperature of approximately 95 to −100° C. and were polymerized by the addition to each of an appropriate quantity of a 1% solution of aluminum chloride in methyl chloride. In each instance the polymerization proceeded promptly to yield a polymer having a Staudinger molecular weight above 30,000. Portions of both polymers were dissolved in a high-grade lubricating oil in an amount of 3% and the viscosity and viscosity index determined. Both polymers were checked for reactivity with para quinone dioxime and found to be reactive for the production of a cured material of good strength.

Example 2

The vinyl isopropyl ether used in this example was prepared by treating vinyl chloride (obtained from acetylene and hydrogen chloride) with the sodium salt of isopropyl alcohol. The reaction split out sodium chloride which precipitated and left the liquid vinyl isopropyl ether. The material was decanted from the precipitated sodium chloride and then boiled over metallic sodium with a reflux condenser until the reaction was well completed. The material was then distilled and the portion boiling between 93° C. and 100° C. was separately collected. This material was found to be vinyl isopropyl ether of 99% or higher purity.

The pure vinyl isopropyl ether prepared as above described was then mixed in the proportion of 1,000 parts by weight with 10 parts by weight of 2–3, dimethyl butadiene. The mixture was then cooled by the addition of approximately 500 parts by weight of pulverized solid $CO_2$. When the temperature of the mixture had dropped to about −75° C. to −78° C., approximately 200 parts by weight of a 20% solution of boron trifluoride in methyl chloride was added to the cold mixture.

The reaction was quite slow in starting and approximately 4% by weight of boron trifluoride (on the weight of mixed unsaturates) was required to obtain a 37% conversion of the mixed unsaturates to copolymer. The reaction reached the 37% conversion obtainable from 4% of catalyst in approximately 1 hour, whereupon the solid polymer was removed from the polymerizer, washed with isopropyl alcohol to inactivate traces of residual catalyst and then washed with water to remove the catalyst and alcohol. The resulting solid polymer was then dried at approximately 80° C. under vacuum to remove as much as possible of the water, alcohol, and traces of catalyst solvent and unpolymerized unsaturates.

The dried polymer showed a Staudinger molecular weight number of approximately 18,000 an an iodine number (by the Wijs method) of approximately 2.1; and was readily naphtha soluble.

Example 3

A mixture was prepared consisting of 1,000 parts by weight of 2-methyl pentadiene-1,3 and 1,000 parts by weight of vinyl isobutyl ether prepared as above described. To the mixture there was then added approximately 500 parts by weight of pulverized solid $CO_2$. When the temperature of the mixture was brought down to about −75° C. to −78° C.; approximately 400 parts by weight of a 3.9% solution of boron trifluoride in ethyl chloride was added.

In this instance, the polymerization began immediately upon addition of the catalyst and continued after the catalyst was added. The mixture with the catalyst in it was allowed to stand for approximately 15 minutes and then approximately 10 parts by weight of isopropyl alcohol were added. The resulting solid polymer was removed and washed with water and then dried under vacuum as in Example 2. The yield was approximately 44.3%. The polymer showed a Staudinger molecular weight number of approximately 38,000. This polymer was compounded on a double roll mill according to the following recipe:

| | Parts |
|---|---|
| Copolymer | 100 |
| Zinc oxide | 5 |
| Stearic acid | 1 |
| Carbon black | 9 |
| Monet (tetra methyl thiuram mono-sulfide) | 0.4 |
| Sulfur | 1.5 |

This compound was placed in the mold and cured for 30 minutes at 287° F. The resulting cured sample was found to have a tensile strength of 2600 pounds per square inch; and modulus (lbs. pull per square inch required to stretch the cured sample by 300%) of 1400, an elongation at break of 585%, and a shore hardness value of 60.

Before curing this polymer it was found to be soluble in linseed oil at temperatures between 200 and 300° C., and upon cooking, the polymer was found to be heat bodyable and reactive with the linseed oil. The resulting cooked mixture yielded an excellent varnish, an excellent enamel base, and an excellent paint base.

Thus, the process of the invention copolymerizes a vinyl ether with a multiolefin in a wide range of proportions to produce highly valuable copolymers having properties adapting them to a wide range of uses.

While there are above disclosed but a limited number of embodiments of the process and product of the invention, it is possible to produce still other embodiments without departing from the inventive concept herein disclosed.

The invention claimed is:

1. A copolymerization process comprising the steps in combination of mixing together one to sixty parts of a multiolefin having from 4 to 10 carbon atoms per molecule and 99 to 40 parts of a vinyl ether having from 3 to 8 carbon atoms per molecule, cooling the mixture to a temperature within the range between +10° C. and −164° C. and polymerizing the resulting mixture by the addition thereto of a Friedel-Crafts catalyst in solution in a solvent which is liquid at the reaction temperature and which does not form a complex with the catalyst.

2. A copolymerization process comprising the steps in combination of mixing together a diolefin having from 4 to 15 carbon atoms per molecule and a vinyl ether having from 3 to 8 carbon atoms per molecule in the proportion of from 1% of the multiolefin with 99% of the vinyl ether to 60% of the multiolefin with 40% of the ether, cooling the mixture to a temperature within the range between +10° C. and −164° C. and polymerizing the resulting mixture by the addition thereto of a Friedel-Crafts catalyst insolution in a solvent which is liquid at the reaction temperature and which does not form a complex with the catalyst.

3. A copolymer of a multiolefin having from 4 to 10 carbon atoms in the proportion of from 1% to 70% with a vinyl ether having from 3 to 8 carbon atoms per molecule in the proportion of 99% to 30%.

4. A copolymerization process comprising the steps in combination of mixing together a butadiene having from 4 to 10 carbon atoms per molecule and vinyl ether having from 3 to 8 carbon atoms per molecule, cooling the mixture to a temperature within the range between +10° C. and −164° C. and polymerizing the resulting mixture by the addition thereto of a Friedel-Crafts catalyst in solution in a solvent which is liquid at the reaction temperature and which does not form a complex with the catalyst.

5. A copolymerization process comprising the steps in combination of mixing together one to 60 parts of an isoprene having from 5 to 6 carbon atoms per molecule and 99 to 40 parts of a vinyl ether having from 3 to 6 carbon atoms per molecule, cooling the mixture to a temperature within the range between +10° C. and −164° C. and polymerizing the resulting mixture by the addition thereto of a Friedel-Crafts catalyst in solution in a solvent which is liquid at the reaction temperature and which does not form a complex with the catalyst.

6. A copolymerization process comprising the steps in combination of mixing together one to sixty parts of piperylene and 99 to 40 parts of a vinyl ether having from 3 to 8 carbon atoms per molecule, cooling the mixture to a temperature within the range between +10° C. and −164° C. and polymerizing the resulting mixture by the addition thereto of a Friedel-Crafts catalyst in solution in a solvent which is liquid at the reaction temperature and which does not form a complex with the catalyst.

7. A copolymerization process comprising the steps in combination of mixing together one to sixty parts of a butadiene having from 4 to 10 carbon atoms per molecule and 99 to 40 parts of isobutyl vinyl ether, cooling the mixture to a temperature within the range between +10° C. and −164° C. and polymerizing the resulting mixture by the addition thereto of a Friedel-Crafts catalyst in solution in an alkyl halide solvent which is liquid at the polymerization temperature and which does not form a complex with the catalyst.

8. A copolymerization process comprising the steps in combination of mixing together one to four parts of isoprene and 99 to 96 parts of propyl vinyl ether, cooling the mixture to a temperature within the range between −95° C. and −103° C. and polymerizing the resulting mixture by the addition thereto of a complex-free solution of an aluminum chloride catalyst in an alkyl chloride which is liquid at the polymerization temperature until a rubber-like sulfur-curable copolymer of a Staudinger molecular weight between 30,000 and 150,000 is formed.

9. A copolymerization process comprising the steps in combination of mixing together one to sixty parts of a conjugated butadiene having from 4 to 6 carbon atoms per molecule and 99 to 40 parts of ethyl vinyl ether, cooling the mixture to a temperature within the range between +10° C. and −103° C. and polymerizing the resulting mixture by the addition thereto of a Friedel-Crafts catalyst in solution in an alkyl halide solvent which does not freeze at the reaction temperature and which does not form a complex with the catalyst until a rubber-like sulfur-curable copolymer of a Staudinger molecular weight between 30,000 and 150,000 is formed.

10. A sulfur-curable rubber-like copolymer of one to 4 parts of isoprene and 99 to 96 parts of a vinyl alkyl ether having from 3 to 6 carbon atoms per molecule, the said copolymer being characterized by a Staudinger molecular weight between 30,000 and 150,000.

DAVID W. YOUNG.
WILLIAM J. SPARKS.

REFERENCES CITED

The following references are of record in the file of this patent:

UNITED STATES PATENTS

| Number | Name | Date |
|---|---|---|
| 2,008,491 | Ebert | July 16, 1935 |
| 2,061,934 | Cunradi | Nov. 24, 1936 |
| 2,125,649 | Reppe | Aug. 2, 1938 |
| 2,364,030 | Snyder | Nov. 28, 1944 |